(12) United States Patent
Sasaki et al.

(10) Patent No.: US 8,467,015 B2
(45) Date of Patent: Jun. 18, 2013

(54) BACKLIGHT UNIT AND LIQUID CRYSTAL MODULE

(75) Inventors: Hisanori Sasaki, Osaka (JP); Shigeru Aruga, Osaka (JP)

(73) Assignee: Panasonic Corporation, Kadoma-shi (JP)

(*) Notice: Subject to any disclaimer, the term of this patent is extended or adjusted under 35 U.S.C. 154(b) by 217 days.

(21) Appl. No.: 13/020,812

(22) Filed: Feb. 4, 2011

(65) Prior Publication Data
US 2012/0033157 A1    Feb. 9, 2012

(30) Foreign Application Priority Data
Aug. 5, 2010   (JP) ................................. 2010-176550

(51) Int. Cl.
*G02F 1/1335*   (2006.01)
*F21V 5/00*     (2006.01)
*F21V 11/00*    (2006.01)

(52) U.S. Cl.
USPC .............................. 349/64; 362/246; 362/355

(58) Field of Classification Search
USPC ..................... 349/64; 362/246, 355
See application file for complete search history.

(56) References Cited

U.S. PATENT DOCUMENTS

| | | | |
|---|---|---|---|
| 6,606,133 B1* | 8/2003 | Okabe | 349/65 |
| 7,636,138 B2* | 12/2009 | Seong et al. | 349/62 |
| 8,057,058 B2* | 11/2011 | Cho | 362/97.4 |
| 2001/0002735 A1* | 6/2001 | Hirota et al. | 264/2.2 |
| 2001/0008468 A1* | 7/2001 | Togashi | 359/642 |
| 2005/0146872 A1* | 7/2005 | Chang et al. | 362/246 |
| 2006/0239006 A1* | 10/2006 | Chaves et al. | 362/294 |
| 2010/0208161 A1* | 8/2010 | Sasaki et al. | 349/58 |

FOREIGN PATENT DOCUMENTS

| | | | |
|---|---|---|---|
| JP | 2006-185908 A | 7/2006 |
| JP | 2008-243637 A | 10/2008 |

* cited by examiner

*Primary Examiner* — Mark Robinson
*Assistant Examiner* — Robert Tavlykaev
(74) *Attorney, Agent, or Firm* — Judge Patent Associates

(57) ABSTRACT

A backlight unit disposed behind a liquid crystal panel 8 includes a case 3 having disposed therein linear light sources 2, a diffusing plate 6A provided between the linear light sources 2 and the liquid crystal panel 8 for diffusing incident light from an entrance surface thereof facing the linear light sources 2 and emitting the diffused light from an exit surface thereof facing the liquid crystal panel 8, and diffusing plate support members 31B1 through 31B6 disposed in the case 3 for supporting the diffusing plate 6A by abutting against the entrance surface facing the linear light sources 2. The diffusing plate 6A includes an abutment portion on the entrance surface at one of the positions corresponding to the diffusing plate support members 31B1 through 31B6, and includes a convex portion on the abutment portion at a position against which the corresponding diffusing plate support member does not abut.

4 Claims, 6 Drawing Sheets

BACKLIGHT UNIT AND LIQUID CRYSTAL MODULE

CROSS REFERENCE TO RELATED APPLICATION

The disclosure of Japanese Patent Application No. 2010-176550, filed Aug. 5, 2010, is incorporated herein by reference.

BACKGROUND OF THE INVENTION

1. Field of the Invention

The present invention relates to a backlight unit for use in, for example, a liquid crystal display apparatus, and a liquid crystal module incorporating the backlight unit.

2. Description of the Background Art

Conventionally, liquid crystal display apparatuses, in which a liquid crystal module is surrounded by a housing, have been known. The liquid crystal module includes a liquid crystal panel and a backlight unit provided behind the liquid crystal panel. Between the liquid crystal panel and the backlight unit, a diffusing plate and optical sheets are provided. Light radiated from the backlight unit and light reflected from a reflector are diffused by the diffusing plate and the optical sheets so that brightness distribution is made uniform, and then emitted to a liquid-crystal-panel side.

Japanese Laid-Open Patent Publication No. 2006-185908 (Patent Literature 1) discloses a configuration of such a liquid crystal display apparatus. In a liquid crystal display apparatus disclosed in FIG. 10 of Patent Literature 1, a rear surface (on a light-source side) of a diffuser sheet is supported by conical diffusing plate support members projected from an inner front surface of a bottom surface of the housing. These diffusing plate support members support the diffusing plate, thereby suppressing deterioration of optical characteristics, which is caused by deflection of the diffusing plate.

Also, in order to improve the optical characteristics of the liquid crystal display apparatus as described above, there is a case where an optical pattern is provided on both surfaces of the diffusing plate. Japanese Laid-Open Patent Publication No. 2008-243637 (Patent Literature 2) discloses in FIG. 2 thereof a diffusing plate in which substantially semicircular portions are provided on a front surface (on a liquid-crystal-panel side) of the diffusing plate, and a matte surface having substantially arc shapes or a slight curve shape is provided on a rear surface (the light-source side) of the diffusing plate.

Even if an optical pattern is provided on both surfaces of a diffusing plate as disclosed in Patent Literature 2, diffusing plate support members are required as disclosed in Patent Literature 1 to prevent the deflection of the diffusing plate. Portions (on a rear surface of the diffusing plate) against which the diffusing plate support members abut are required to stably support the diffusing plate.

SUMMARY OF THE INVENTION

In view of the above problem, an object of the present invention is to provide a backlight unit capable of stably holding a diffusing plate having excellent optical characteristics, and a liquid crystal module incorporating the same.

In order to solve the above problem, the backlight unit of the present invention is disposed behind a display element. The backlight unit includes a case and a diffusing plate. Light sources are disposed in the case. The diffusing plate is provided between the light sources and the display element for diffusing incident light from an entrance surface on a light-source side and emitting the diffused light from an exit surface on a display-element side. A plurality of support members are provided in the case for supporting the diffusing plate by abutting against the entrance surface of the diffusing plate on the light-source side. The diffusing plate includes abutment portions on the entrance surface at positions corresponding to the support members, and includes convex portions on the abutment portions at positions against which the support members do not abut.

In the above configuration, the diffusing plate includes the abutment portions on the entrance surface at positions corresponding to the support members, and includes the convex portions on the abutment portions at positions against which the support members do not abut. Because of this, if the diffusing plate is formed by resin injection molding, a diffusing plate having excellent optical characteristics, which includes a light management portion on each of the exit surface and the entrance surface, can readily be manufactured. Further, convex portions formed of the resin, which remains after the injection molding at a gate portion as a resin injection opening, exist on the abutment portions provided in the diffusing plate, at positions against which the support members do not abut. Therefore, it is possible to lessen a situation in which the convex portions adversely affect the optical characteristics, and also to allow the diffusing plate to be stably supported. As a result, the backlight unit, which includes the diffusing plate having the excellent optical characteristics, can be provided.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, embodiments of the present invention are described, with reference to the accompanying drawings.

First Embodiment

Figure 1:
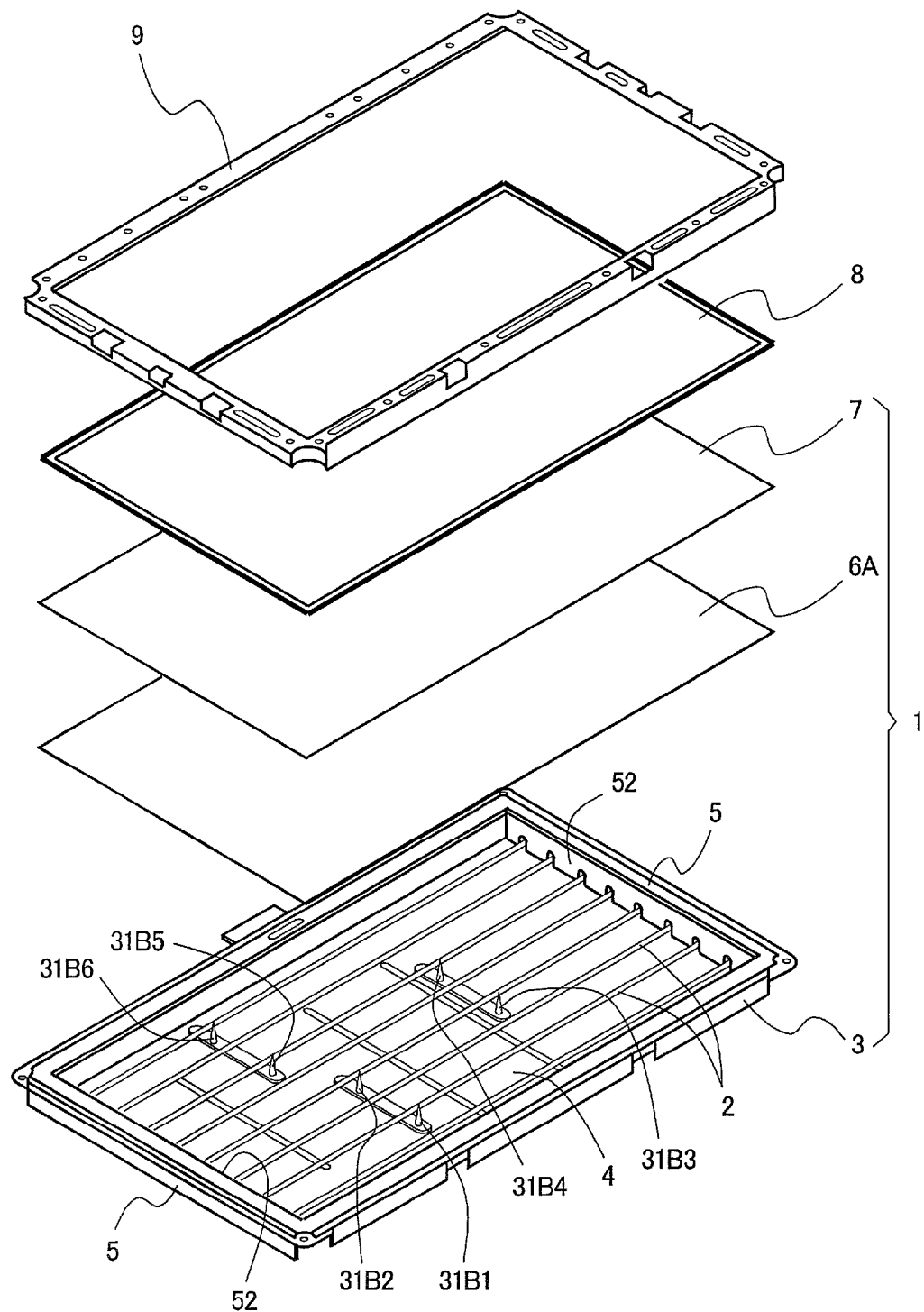
FIG. 1 is an exploded perspective view of a liquid crystal module incorporating a backlight unit according to a first embodiment of the present invention.
Figure 2:
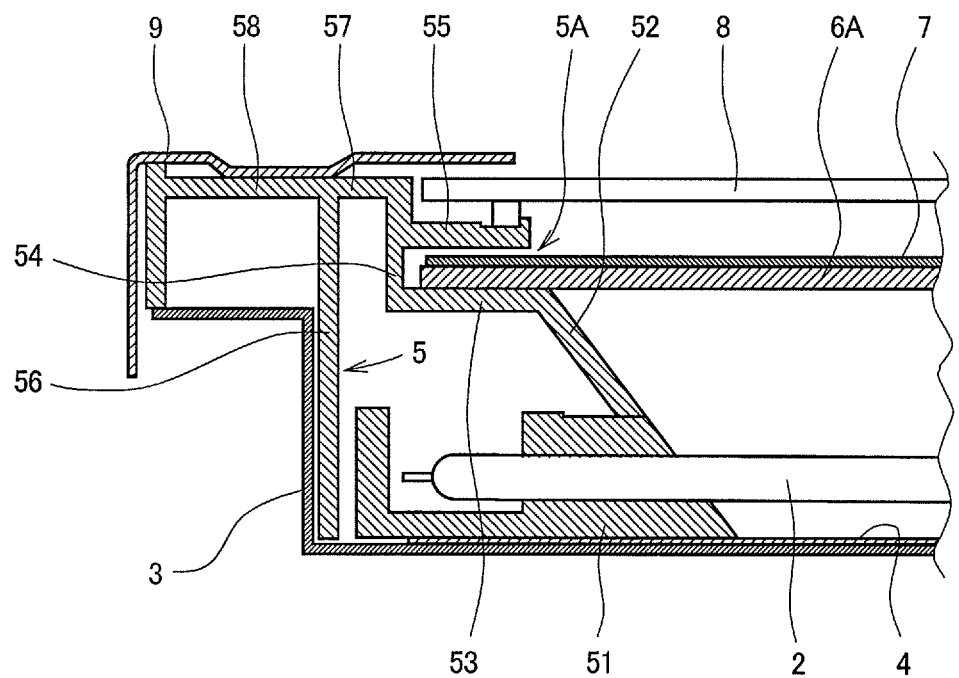
FIG. 2 is a partial sectional view of the liquid crystal module of FIG. 1.

FIG. 1 and FIG. 2 show a liquid crystal module incorporating a backlight unit 1 according to a first embodiment of the present invention. The liquid crystal module includes a liquid crystal panel 8 as a display element, and a backlight unit 1 provided behind the liquid crystal panel 8. A periphery of the liquid crystal panel 8 is secured to the backlight unit 1 by a cover frame 9. The liquid crystal module includes a controlling device for controlling the liquid crystal panel 8, and a drive unit which includes a DC/DC power supply or the like for supplying power to the backlight unit 1, and the like. However, publicly known components can be employed for these components, and thus description and illustration thereof is omitted.

The backlight unit 1 illuminates the liquid crystal panel 8 as the display element from behind the liquid crystal panel 8. Hereinafter, a side on which the backlight unit 1 radiates light (a front-surface side: a liquid-crystal-panel side, an exit-surface side) may be described as an upper side, and its opposite side (a rear-surface side: a light-source side, an entrance-surface side) may be described as a lower side, for the convenience of description.

Specifically, the backlight unit 1 includes a plurality of linear light sources 2 arranged in a predetermined direction (a direction parallel to the liquid crystal panel 8), a case 3 for holding the linear light sources 2 from a side (a side in the direction orthogonal to an arrangement plane of the linear light sources 2) opposite to the liquid crystal panel 8, and a diffusing plate 6A disposed in such a manner as a lid covering the case 3. A reflection sheet 4 is provided on a bottom surface of the case 3 so as to face the linear light sources 2 held in the case 3, and a pair of support members 5 is disposed in the case 3, which are spaced apart from each other in the lengthwise direction of the linear light sources 2. Also, disposed on the diffusing plate 6A are optical sheets 7, such as prism sheets, for diffusing or condensing light transmitted through the diffusing plate 6A.

Generally, the backlight unit 1 has a rectangular shape in plan view, extending in the lengthwise direction of the linear light sources 2. The bottom surface of the case 3 and the diffusing plate 6A also have a rectangular shape, having a longitudinal dimension thereof in the lengthwise direction of the linear light sources 2, and a transverse dimension thereof in a predetermined orientation in which the linear light sources 2 are arranged (hereinafter, referred to as "arrangement orientation of the light sources").

In the present embodiment, cold-cathode fluorescent lamps (CCFL) formed in a straight pipe shape are used as the linear light sources 2, and arranged in parallel with one another. The linear light sources 2 are covered at their end portions by the spaced apart support members 5. However, U-shaped cold-cathode fluorescent lamps may be disposed in the case 3. In such case, linear portions of the U-shaped lamp are considered to be the "linear light sources" of the present invention.

The case 3 is made of a metal, such as aluminum, or a resin. The case 3 has the shape of a box opening in one direction, and includes a bottom wall which constitutes a bottom surface parallel to the arrangement plane of the linear light sources 2, and peripheral walls upstanding from the periphery of the bottom wall. The case 3 of the present embodiment also includes a flange portion connected to an upper end of each of the peripheral walls.

The reflection sheet 4 covers the bottom surface of the case 3 substantially in its entirety. The reflection sheet 4 is made of a metal foil, for example, and reflects, to the rear surface of the diffusing plate 6A, light which has been radiated from the linear light sources 2 to an opposite side of the diffusing plate 6A.

The support members 5 are each made of a highly reflective material. For such a highly reflective material, a polycarbonate mixed with titanium oxide can be used, for example. The support members 5 are integrally molded in the present embodiment.

As shown in FIG. 2, each support member 5 includes a base portion 51 for holding an end portion of each linear light source 2, and a reflecting portion 52 extending obliquely upward and outwardly from the end of the base portion 51 that faces inwardly toward the center of the case 3. A side surface of the base portion 51 that faces inwardly toward the center of the case 3 inclines so as to constitute a continuous surface with a side surface the reflecting portion 52 that faces inwardly toward the center of the case 3. Because of this, light traveling from the linear light sources 2 and the reflection sheet 4 toward the support member 5 is reflected from the inner side surfaces of the base portion 51 and the reflecting portion 52 toward the diffusing plate 6A.

Moreover, each support member 5 includes a first support portion 53 for supporting the diffusing plate 6A, a second support portion 55 for supporting the liquid crystal panel 8, and a vertical wall portion 54 facing an edge face of the diffusing plate 6A for integrally coupling the first support portion 53 and the second support portion 55. The first support portion 53 extends outwardly from an upper end of the reflecting portion 52, and parallel to the bottom surface of the case 3. The vertical wall portion 54 extends vertically upward from the end of the first support portion 53 that faces outwardly away from the center of the case 3. The second support portion 55 projects inwardly from an upper end of the vertical wall portion 54, and parallel to the first support portion 53. The first support portion 53, the second support portion 55, and the vertical wall portion 54 together form a recessed portion 5A which has the shape of a groove opening inwardly toward the center of the case 3. An end portion of the diffusing plate 6A in the longitudinal dimension is inserted in the recessed portion 5A.

Each support member 5 includes a bending portion 57, a side wall portion 56, and a securing portion 58. The bending portion 57 has a substantially L-shaped cross-section, extending toward the upper side from the outer end of the second support portion 55, and then extending outwardly away from the center of the case 3. The side wall portion 56 hangs downwardly from the outer end of the bending portion 57 along the peripheral wall of the case 3. The securing portion 58 secures the cover frame 9, which is connected to the outer end of the bending portion 57.

The diffusing plate 6A is formed by injection molding of a transparent resin, such as a polystyrene or a polycarbonate material, and provided between the linear light sources 2 and the liquid crystal panel 8. The diffusing plate 6A diffuses incident light from an entrance surface thereof facing the linear light sources 2 and emits the diffused light from an exit surface thereof facing the liquid crystal panel 8. Specifically, as shown in FIG. 2, the diffusing plate 6A is provided on the side of the linear light sources 2 that is opposite to that of the reflection sheet 4, interposing therebetween the linear light sources 2. The diffusing plate 6A includes the entrance surface, which causes direct light from the linear light sources 2 and reflected light from the reflection sheet 4 to enter the upper side, and the exit surface, which emits light diffused within the diffusing plate 6A. The optical sheets 7 described above are disposed on the exit surface.

Figure 3:
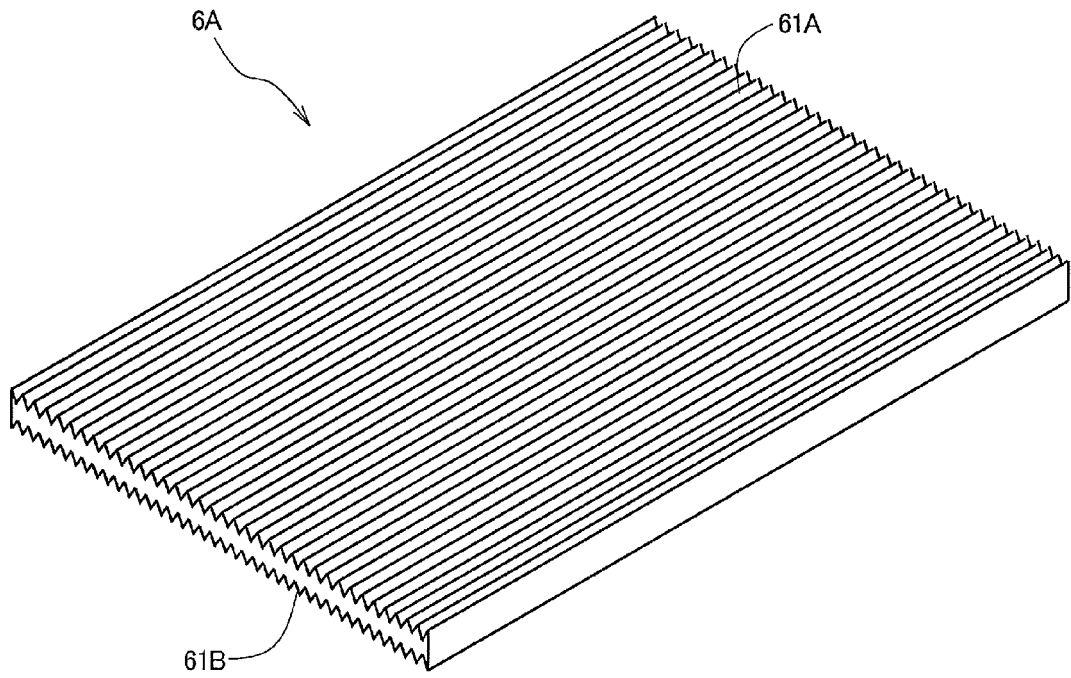
FIG. 3 is a perspective view (a front surface: a liquid-crystal-panel side, an exit surface) of a diffusing plate incorporated in the backlight unit of FIG. 1.
Figure 4:
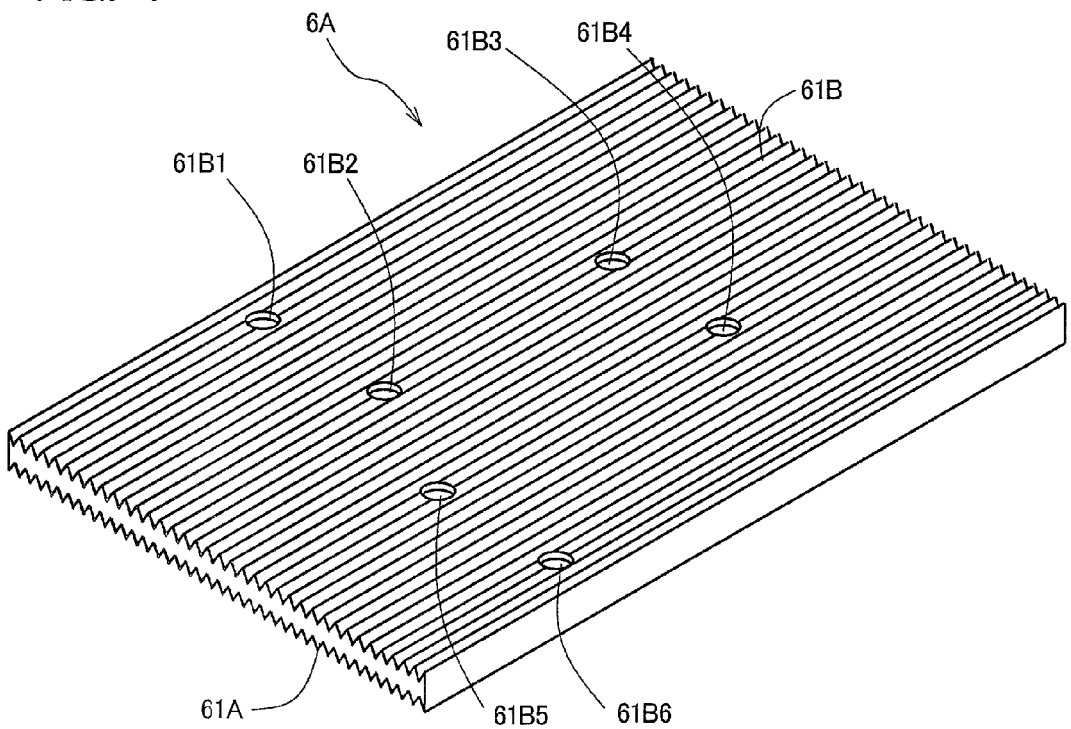
FIG. 4 is a perspective view (a rear surface: a light-source side, an entrance surface) of the diffusing plate incorporated in the backlight unit of FIG. 1.

FIG. 3 shows a perspective view of a surface of the diffusing plate 6A on the upper side (the front surface: the liquid-crystal-panel side, the exit surface), and FIG. 4 shows a perspective view of a surface of the diffusing plate 6A on the lower side (the rear surface: the light-source side, the entrance surface). As shown in FIG. 3 and FIG. 4, a light management portion 61A and a light management portion 61B are formed on the front surface and the rear surface of the diffusing plate 6A, respectively. The light management portion 61A and the light management portion 61B each have a striped pattern parallel to the linear light sources 2. In the present embodiment, the light management portion 61A includes a plurality of prism structures (projection portions each having a triangular cross-section), which determine a direction of refraction of the light transmitted through the exit surface. The light management portion 61B includes a plurality of prism structures (projection portions each having a triangular cross-section), which determine a direction of refraction of the light transmitted through the entrance surface.

The light management portion 61A and the light management portion 61B are each configured to homogenize the direct light from the linear light sources 2 and the reflected light from the reflection sheet 4 in the arrangement orientation of the light sources, respectively. Specifically, on portions of the diffusing plate 6A which are above the linear light sources 2, pitches between the prism structures are set relatively close to each other and, on portions which are not above but between the linear light sources 2, the pitches between the prism structures are set so as to gradually be coarsened with distance from the linear light sources 2. The three-dimensional shape of the light management portion is not limited to the above-described shape.

A diffusing plate for use in a conventional backlight unit is typically extruded, and thus merely a light management portion is formed on the exit surface. The diffusing plate 6A according to the present embodiment is molded by casting a resin into a mold so that an optical pattern as a light management portion is formed on both sides of the diffusing plate 6A. The mold includes a shape corresponding to the prism structures which is the optical pattern formed on both surfaces of the diffusing plate. The diffusing plate 6A, which is injection molded by using the above-described mold, includes the light management portion 61B formed on the entrance surface, in addition to the light management portion 61A formed on the exit surface. This allows an improvement in the effect of homogenizing the light, which is radiated from the backlight unit, by using the single diffusing plate 6A, which results in reduction of the number of prism sheets (optical sheets).

As shown in FIG. 4, the diffusing plate 6A includes smooth portions 61B1, 61B2, 61B3, 61B4, 61B5, and 61B6, on the entrance surface, which is the rear surface of the diffusing plate 6A, as a plurality (here, six) of abutment portions formed by recessing portions of the entrance surface at positions corresponding to diffusing plate support members 31B1, 31B2, 31B3, 31B4, 31B5, and 31B6, respectively. The distal ends of the diffusing plate support members 31B1 through 31B6 in FIG. 1 abut against the smooth portions 61B1 through 61B6, respectively, and thus the diffusing plate 6A is supported by the diffusing plate support members 31B1 through 31B6. Accordingly, the diffusing plate 6A can be supported without being deflected. As shown in FIG. 1, the diffusing plate support members 31B1 through 31B6 are each provided between a pair of the linear light sources 2.

Figure 5:
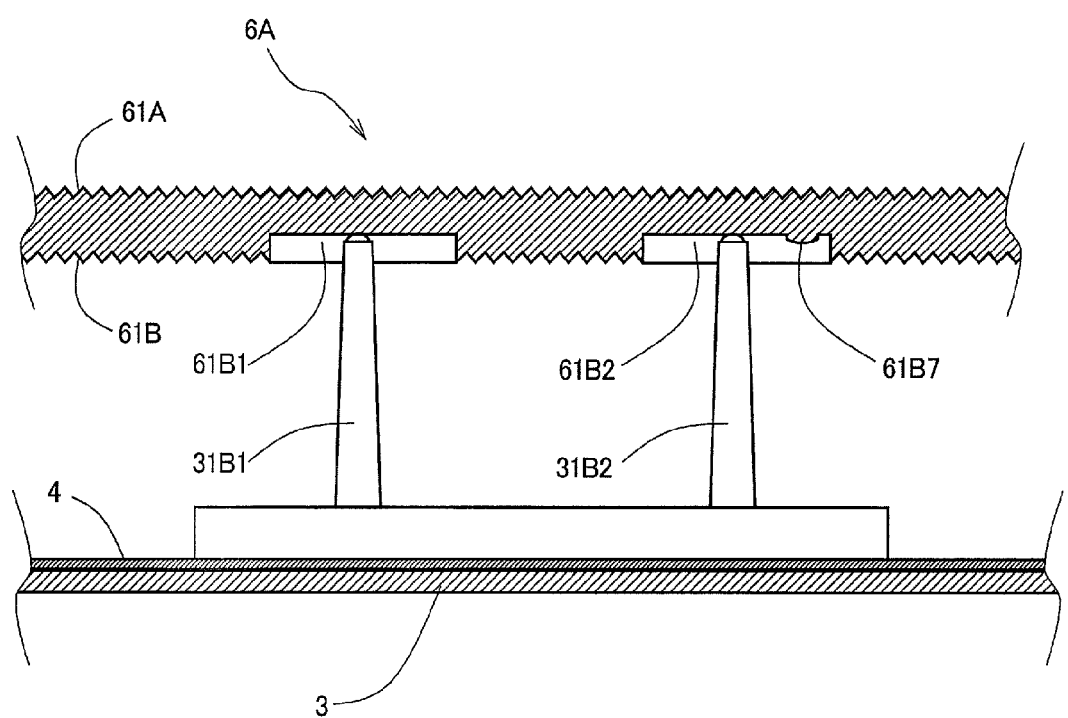
FIG. 5 is a cross-sectional view of the diffusing plate of FIG. 3.

FIG. 5 shows a cross-sectional view including the smooth portion 61B1 and the smooth portion 61B2 of FIG. 4. As shown in FIG. 5, the diffusing plate support members 31B1 and 31B2 each have a stick shape, and the distal ends thereof are rounded so as not to impair the smooth portions 61B1 and 61B2 of the diffusing plate 6A, respectively. The smooth portions 61B1 and 61B2 are each provided in a recessed portion in the rear surface of the diffusing plate 6A. The recessed portion is provided without penetrating through the diffusing plate 6A. The distal end of the diffusing plate support member 31B1 abuts against the smooth portion 61B1, and the distal end of the diffusing plate support member 31B2 abuts against the smooth portion 61B2. The diffusing plate support members 31B1 through 31B6 abut against the smooth portions 61B1 though 61B6, respectively, which do not include the prism structures but the smooth abutment surfaces, the diffusing plate support members 31B1 through 31B6 and the smooth portions 61B1 though 61B6 functioning to stably support the diffusing plate 6A.

As shown in FIG. 5, the smooth portion 61B2 includes a gate convex portion 61B7 as a convex portion. The gate convex portion 61B7 is formed of a resin, which remains at a gate portion after injection molding as a resin injection opening. It is also suitable if the smooth portion 61B1 includes the gate convex portion 61B7.

FIG. 6 shows the mold and the injection molding steps in forming the diffusing plate 6A. In FIG. 6, a mold 100 and a mold 200 are caused to become close to each other as close as the thickness of the diffusing plate, and then the resin is cast in between the mold 100 and the mold 200. The present invention, however, is not limited to the resin molding method and the diffusing plate manufactured by the mold, as described above.

Figure 6A:
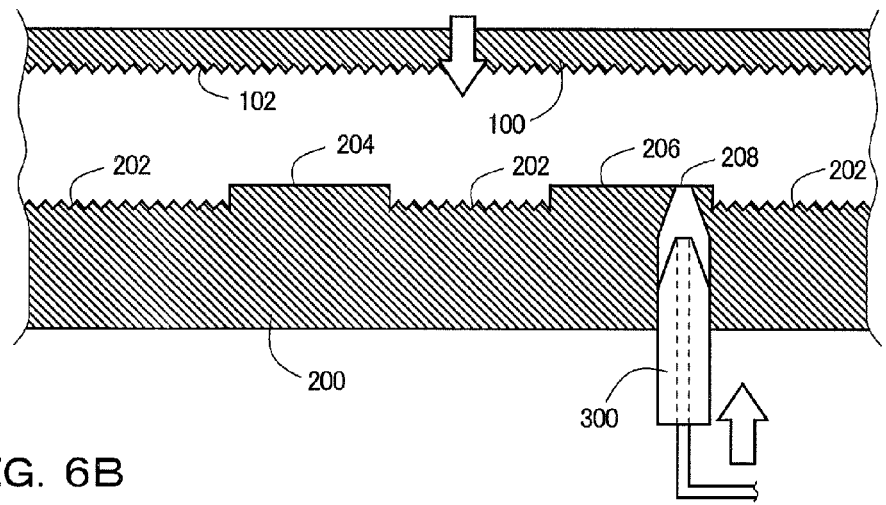
FIGS. 6A-6D are diagrams showing the diffusing plate of FIG. 5 and a mold, when the diffusing plate is manufactured by injection molding.

As shown in FIG. 6(A), the mold 100 includes a triangular portion 102 which corresponds to the light management portion 61A (the prism structures) formed on the front surface of the diffusing plate 6A. The mold 200 includes a triangular portion 202 which corresponds to the light management portion 61B (the prism structures) formed on the rear surface of the diffusing plate 6A, and cylindrical portions 204 and 206 which correspond to the smooth portions. The cylindrical portion 206 includes a gate (a resin gate) 208 used for casting the resin into the mold.

Figure 6B:
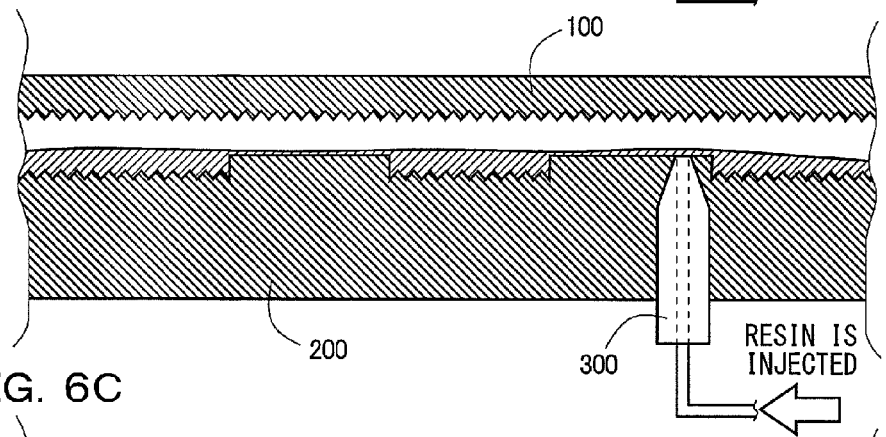
Figure 6C:
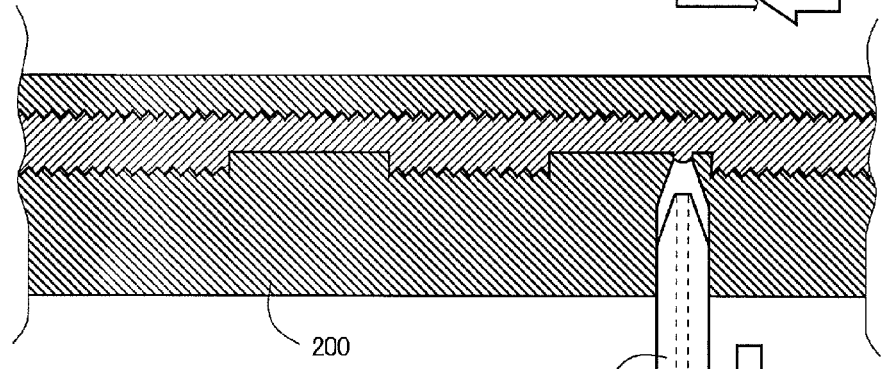

While the mold 100 the mold 200 are disposed as shown in FIG. 6(B), a hot runner 300 is introduced into the mold 200, and a transparent liquid resin for molding the diffusing plate is injected through the gate 208. Thereafter, as shown in FIG. 6(C), the resin injection through the hot runner 300 is stopped before the resin is cured, and then, the hot runner 300 is moved so as to be removed from the mold 200, and the resin is cured.

Figure 6D:
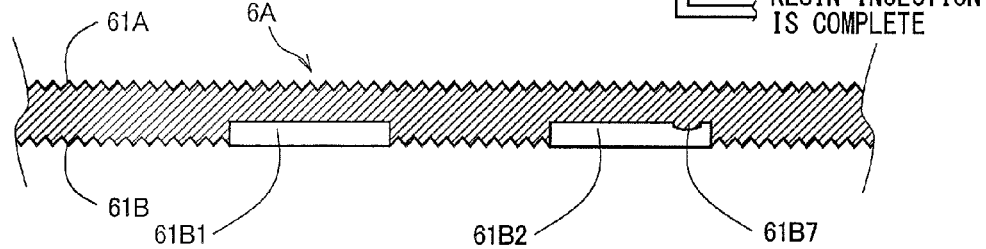

Thereafter, as shown in FIG. 6(D), the mold 100 and the mold 200 are removed, leaving the resin-molded diffusing plate 6A.

As shown in FIG. 6(A) through FIG. 6(D), when the diffusing plate 6A is manufactured by resin injection molding, the gate convex portion 61B7 is formed of the resin which remains at a position of the gate 208. This gate convex portion 61B7 is formed on the smooth portion 61B2, projecting toward the light-source side. Because the gate convex portion 61B7 remains within the smooth portion 61B2, it has no influence on the optical characteristics of the diffusing plate 6A. Also, as shown FIG. 5, the diffusing plate support member 31B2 abuts against the diffusing plate 6A at a position other than the position of the gate convex portion 61B7. The smooth portion 61B2 has a shape obtained by recessing the prism structures on the rear surface of the diffusing plate 6A so that the light management portion 61B is not formed at the position.

In the present embodiment, the mold which includes three gates is used, and therefore three gate convex portions are formed on the diffusing plate 6A. Other than the smooth portion 61B2, for example, the smooth portion 61B4 and the smooth portion 61B6 each include a gate convex portion. In general, although depending on the size of the resin-molded item, at least two or three gates are provided so that the resin is uniformly cast into the mold. In the present embodiment, the positions of the gates (and therefore, of the gate convex portions) are made to coincide with the positions of the diffusing plate support members.

As described above, in the present embodiment, the six diffusing plate support members abut against the six smooth portions. Positions of three diffusing plate support members among the six (positions of the abutment portions) are made to coincide with the gate positions, and thus the gate convex portions are formed on the three abutment portions. The number of the abutment portions may be the same as the number of gates and, preferably, the abutment portions are formed at all positions of the gates. Further, if the number of abutment portions is greater than the number of gates, the diffusing plate 6A can be supported at more positions, and therefore the diffusing plate 6A can be more stabilized. Preferably, the number of abutment portions is equal to or greater than the number of gates, the positions of the abutment portions are located in gaps provided between the linear light sources 2 disposed, and even if the number of abutment portions is small, the abutment portions are provided at positions which facilitates the suppression of the deflection of the diffusing plate 6A.

Otherwise, that is, if the positions of the gates are at positions other than those of the diffusing plate support members, the following problem occurs. If the gates are not at the positions of the diffusing plate support members, the gate convex portions are formed on portions in the prism structures. Because of this, the gate convex portions influence the optical characteristics of the prism structures, thereby reducing the effect of homogenizing the light radiated from the backlight unit. This makes less sense of providing the optical pattern even on the rear surface of the diffusing plate, and in addition, the number of optical sheets cannot be reduced.

Further, the distal ends of the diffusing plate support members abut against the smooth areas of the abutment portions, and thus, the distal ends do not abut against the gate convex portions of the abutment portions, thereby allowing more stable support for the diffusing plate by the diffusing plate support members.

As described above, according to the liquid crystal module incorporating the backlight unit of the present embodiment, the optical pattern is provided on both surfaces of the diffusing plate, thereby improving the effect of the diffusing plate. Further, the smooth portions are formed by recessing a portion of the rear surface of the diffusing plate and, therefore, while maintaining the operation and effect of the prism structures, stability of the diffusing plate is enhanced by causing the diffusing plate support members to abut against the smooth portions. Still further, the positions of the gate for injection molding are made to coincide with the smooth portions, and thus the gate convex portions are formed not at positions in which the prism structures are formed, but on the smooth portions. Therefore, the gate convex portions cause no adverse effect on the optical characteristics of the diffusing plate.

Second Embodiment

Figure 7:
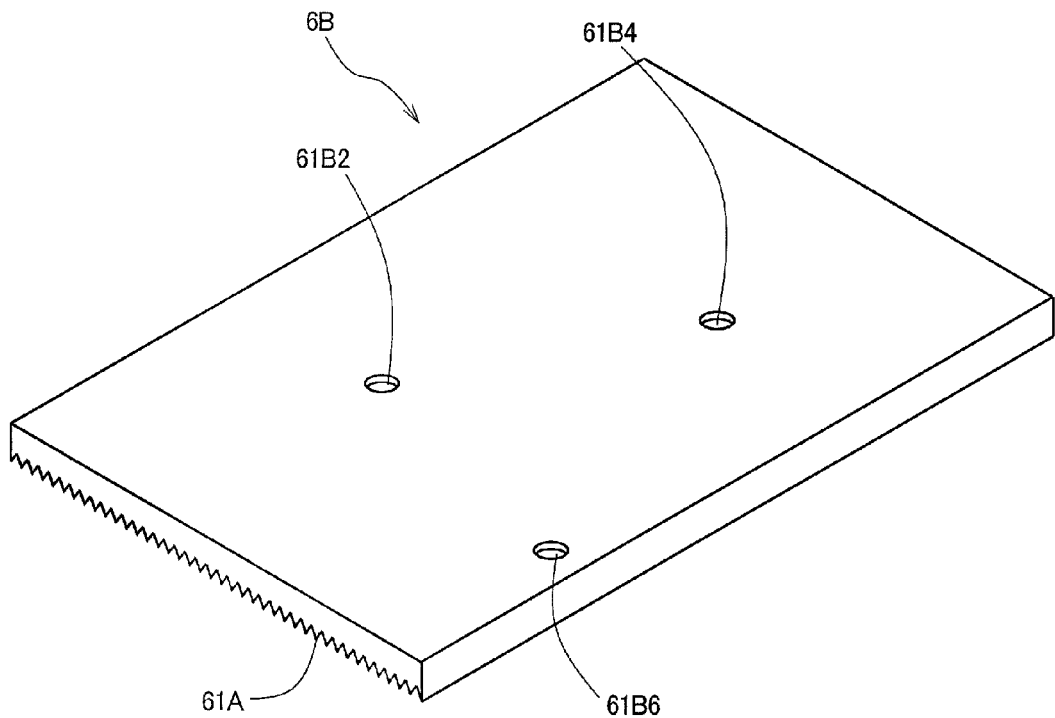
FIG. 7 is a perspective view (a rear surface: a light-source side, an entrance surface) of a diffusing plate incorporated in a backlight unit according to a second embodiment of the present invention.
Figure 8:
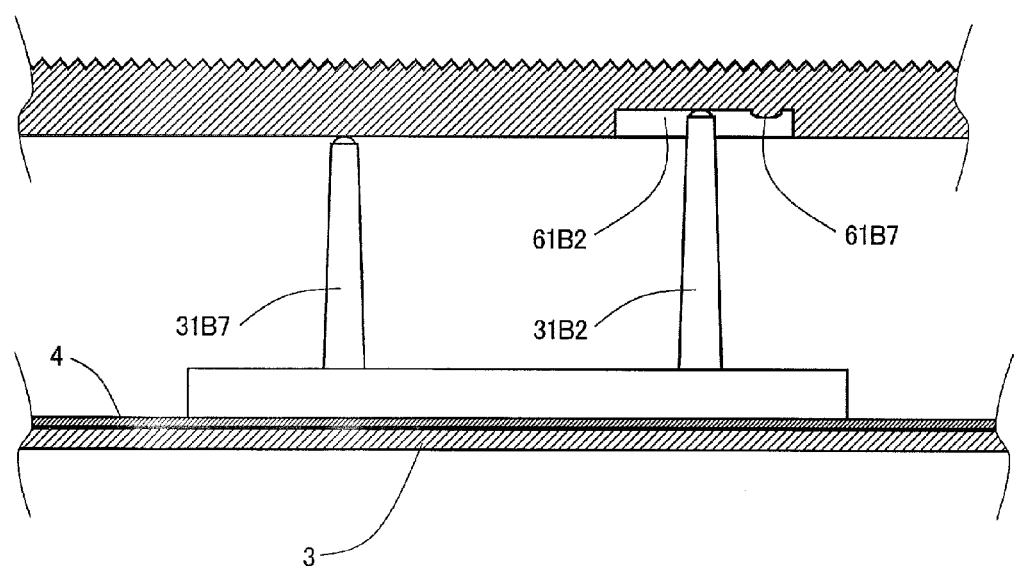
FIG. 8 is a cross-sectional view of the diffusing plate of FIG. 7.

Next, description is given of a backlight unit according to a second embodiment of the present invention. The backlight unit of the second embodiment is different from that of the first embodiment in that the diffusing plate 6A of the backlight unit 1 in the first embodiment is changed to a diffusing plate 6B shown in FIG. 7 and FIG. 8. Thus, hereinafter, description is given of merely the diffusing plate 6B. FIG. 8 is a cross-sectional view showing a cross-sectional structure of a main portion of the diffusing plate 6B shown in FIG. 7.

The surface (a front surface: a liquid-crystal-panel side, an exit surface) of the diffusing plate 6B on the upper side includes the same configuration as that of the diffusing plate 6A (see FIG. 3). The configuration of the surface (a rear surface: a light-source side, an entrance surface) of the diffusing plate 6B on the lower side does not include the light management portion 61B (the prism structures) of the diffusing plate 6A (see FIG. 4). As shown in FIG. 7 and FIG. 8, the rear surface of the diffusing plate 6B is a flat surface. The diffusing plate 6B is manufactured by injection molding in the same manner as the manufacture of the diffusing plate 6A. The diffusing plate 6B includes a smooth portion 61B2, and a gate convex portion 61B7 is formed on the smooth portion 61B2 in the same manner as the gate convex portion of the diffusing plate 6A. As the first embodiment, the gate convex portion 61B7 is formed of the resin, which remains at a resin gate used for casting a resin into a mold, at the position of the gate (the resin gate).

According to the diffusing plate 6B, when the diffusing plate is manufactured by injection molding, the position of the gate for injection molding is made to coincide with the smooth portion 61B2, and therefore the gate convex portion 61B7 is formed on the smooth portion 61B2, and thus, the gate convex portion 61B7 does not project on the rear surface of the diffusing plate. Therefore, the gate convex portion 61B7 causes no adverse effect on the optical characteristics of the diffusing plate 6B.

In the second embodiment, the smooth portion, which has a shape obtained by recessing a portion of the rear surface of the diffusing plate 6B, is not necessarily formed on all abutment portions provided at positions corresponding to respective diffusing plate supports. The smooth portions as shown in FIG. 8 may be formed at least on the abutment portion in which the gate convex portion 61B7 is formed.

Other Embodiments

Although each linear light source 2 is formed of one cold-cathode fluorescent lamp in the first embodiment and the second embodiment described above, the linear light source 2 may be formed of a plurality of LEDs. In this case, the plurality of LEDs may be configured to be arranged in line. As the first embodiment and the second embodiment, even if the linear light sources 2 are configured by the LEDs accordingly, the backlight unit which includes the diffusing plate having the excellent optical characteristics can be provided without an increase of processing cost.

Also, although the light management portion includes a plurality of prism structures in the first embodiment and the second embodiment, the present invention is not limited thereto. If the light management portion has operation and effect of improving the optical characteristics, and includes a configuration in which a resin is cast into a form (which is not limited to the mold) to form the light management portion, such a light management portion can be employed as the light management portion of the present invention. The three-dimensional shape of the light management portion indicates that the above-described prism structures are included, and any structure having any other shape is suitable.

The present invention can achieve a backlight unit having uniform brightness, for example, and is applicable to backlight units for various types of purposes.

While the invention has been described in detail, the foregoing description is in all aspects illustrative and not restrictive. It will be understood that numerous other modifications and variations can be devised without departing from the scope of the present invention.

What is claimed is:

1. A backlight unit disposed behind a display element, comprising:
    a case having disposed therein one or more light sources;
    a diffusing plate provided between the at least one light source and the display element, the diffusing plate being configured to diffuse incident light from an entrance surface thereof facing the at least one light source, and emit the diffused light from an exit surface thereof facing the display element; and
    a plurality of support members disposed in the case, the plurality of support members being configured to support the diffusing plate by abutting against the entrance surface of the diffusing plate, wherein
    the diffusing plate includes recessed abutment portions in the entrance surface at positions corresponding to the support members, bottom surfaces of the recessed abutment portions allowing light from the one or more light sources to pass therethrough, and includes a convex portion on one of the bottom surfaces of the recessed abutment portions, at a position other than where a corresponding support member abuts on the one of the bottom surfaces.

2. The backlight unit according to claim 1, wherein the diffusing plate is formed by resin injection molding, and the convex portion is a residue of a resin injection opening in a mold used for the resin-injection-molding formation of the diffusing plate.

3. The backlight unit according to claim 1, wherein the support members are disposed between two or more of the one or more light sources.

4. A liquid crystal module comprising:
    the backlight unit according to claim 1; and
    a liquid crystal panel, as the display element, which is illuminated from behind thereof by the backlight unit.

* * * * *